(12) United States Patent
Khalili et al.

(10) Patent No.: US 10,627,145 B2
(45) Date of Patent: Apr. 21, 2020

(54) VECTOR DRIVE FOR VAPOR COMPRESSION SYSTEMS

(71) Applicant: Rocky Research, Boulder City, NV (US)

(72) Inventors: Kaveh Khalili, Boulder City, NV (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 95 days.

(21) Appl. No.: 15/204,879

(22) Filed: Jul. 7, 2016

(65) Prior Publication Data

US 2018/0010835 A1    Jan. 11, 2018

(51) Int. Cl.

| | |
|---|---|
| F25B 49/02 | (2006.01) |
| H02P 21/00 | (2016.01) |
| F24F 11/83 | (2018.01) |
| F24F 11/30 | (2018.01) |
| F25B 7/00 | (2006.01) |
| F25B 13/00 | (2006.01) |
| H02P 21/36 | (2016.01) |
| H02P 21/34 | (2016.01) |
| F24F 110/20 | (2018.01) |
| F24F 11/85 | (2018.01) |
| F24F 11/46 | (2018.01) |
| F24F 110/10 | (2018.01) |

(52) U.S. Cl.
CPC ............ *F25B 49/022* (2013.01); *F24F 11/30* (2018.01); *F24F 11/83* (2018.01); *F25B 7/00* (2013.01); *F25B 13/00* (2013.01); *F25B 49/025* (2013.01); *H02P 21/00* (2013.01); *F24F 11/46* (2018.01); *F24F 11/85* (2018.01); *F24F 2110/10* (2018.01); *F24F 2110/20* (2018.01); *F25B 2313/0293* (2013.01); *F25B 2313/0294* (2013.01); *F25B 2600/024* (2013.01); *F25B 2600/0253* (2013.01); *F25B 2600/111* (2013.01); *F25B 2600/112* (2013.01); *F25B 2700/02* (2013.01); *F25B 2700/2106* (2013.01); *H02P 21/34* (2016.02); *H02P 21/36* (2016.02); *Y02B 30/741* (2013.01)

(58) Field of Classification Search
None
See application file for complete search history.

(56) References Cited

U.S. PATENT DOCUMENTS

| | | |
|---|---|---|
| 4,459,819 A | 7/1984 | Hargraves |
| 4,616,484 A | 10/1986 | Mehdi |
| | (Continued) | |

OTHER PUBLICATIONS

Search Report and Written Opinion dated Oct. 2, 2017 in Application No. PCT/US2017/32896.

*Primary Examiner* — Ljiljana V. Ciric
*Assistant Examiner* — Alexis K Cox
(74) *Attorney, Agent, or Firm* — Knobbe Martens Olson & Bear LLP

(57) ABSTRACT

A vector control system is used to control a vapor compression circuit that includes a compressor motor. The vector control system is used to monitor the vapor compression circuit and adjust the speed of one or more motors within the vapor compression circuit to increase efficiency of the system by taking into account the torque forces placed on the compressor motor.

11 Claims, 3 Drawing Sheets

(56) References Cited

U.S. PATENT DOCUMENTS

| | | | |
|---|---|---|---|
| 5,036,676 A * | 8/1991 | Dudley | F24F 1/0003 62/115 |
| 5,050,394 A * | 9/1991 | Dudley | F24D 17/02 62/115 |
| 5,052,186 A * | 10/1991 | Dudley | F24H 4/04 62/215 |
| 5,159,255 A | 10/1992 | Weber | |
| 5,214,367 A | 5/1993 | Uesugi | |
| 5,440,895 A * | 8/1995 | Bahel | F24F 11/0009 62/211 |
| 5,463,876 A | 11/1995 | Bessler et al. | |
| 5,507,957 A | 4/1996 | Garrett et al. | |
| 5,675,982 A | 10/1997 | Kirol et al. | |
| 5,950,439 A * | 9/1999 | Peterson | F25B 49/02 417/22 |
| 6,843,064 B2 | 1/2005 | Khalili et al. | |
| 9,239,174 B2 | 1/2016 | Rockenfeller et al. | |
| 9,574,810 B1 * | 2/2017 | West | F25B 49/02 |
| 2002/0100285 A1 * | 8/2002 | Baruschke | B60H 1/3208 62/133 |
| 2006/0059930 A1 * | 3/2006 | Eisenhour | B60H 1/3216 62/228.5 |
| 2009/0255278 A1 * | 10/2009 | Taras | F25B 49/025 62/115 |
| 2009/0272128 A1 | 11/2009 | Ali | |
| 2010/0083693 A1 | 4/2010 | Todd | |
| 2012/0198867 A1 | 8/2012 | Ng | |
| 2013/0174591 A1 | 7/2013 | Das | |
| 2014/0360211 A1 | 12/2014 | Hovel | |
| 2015/0027138 A1 | 1/2015 | Schuster | |

\* cited by examiner

VECTOR DRIVE FOR VAPOR COMPRESSION SYSTEMS

BACKGROUND OF THE INVENTION

Field of the Invention

Aspects of the invention relate to systems and methods for controlling a vapor compression system. More particularly, aspects of the invention relate to vapor compression systems that can be controlled to increase their efficiency by modulating the speed and torque placed on a compressor.

Description of the Related Art

Vapor compression systems include Heating, Ventilation and Air Conditioning (HVAC) systems, refrigeration systems and heat pump systems are widely used in many industrial and residential applications. More recent systems can use variable speed compressors, variable position valves, and variable speed fans to increase the flexibility of controlling the vapor compression cycle.

An operation cycle of the vapor compression system starts by using a compressor to compress the gaseous refrigerant to a high-temperature, high-pressure vapor state. The refrigerant then flows into a condenser. Because the air flowing over the condenser coils is cooler than the refrigerant, the refrigerant cools to form a high-pressure, somewhat reduced temperature liquid when exiting the condenser. This is typically called the "high side" of the vapor compression cycle.

The liquid refrigerant then passes through an expansion valve that decreases the pressure. The expansion valve may be a pulsing expansion valve that can accurately control the refrigerant without overshooting and hunting during dynamic operating conditions. One type of pulsing expansion valve can be found in U.S. Pat. No. 6,843,064, issued Jan. 18, 2005 which is hereby incorporated by reference in its entirety. The low-pressure refrigerant boils at a lower temperature, so the air passing over the evaporator coils heats the refrigerant. Thus, the air is cooled down, and the low-pressure liquid refrigerant is converted to a low-pressure vapor. This low-pressure, low-temperature vapor then enters the compressor, and the operation of the vapor compression system continues to cycle. This is typically called the "low side" of the vapor compression cycle.

Vapor compression systems take advantage of the latent heat of vaporization of liquids that have a boiling point lower than the desired temperature to be managed. The four major elements of the system are the compressor, condenser, expansion valve, and evaporator. In the evaporator, the refrigerant vaporizes at a low temperature, absorbing heat from the environment. At the evaporator, the refrigerant is a low temperature vapor. The vapor then passes through the compressor, where it is brought to high pressure and a temperature typically 10° C. to 15° C. higher than ambient. This hot vapor is converted to liquid in the condenser where heat is rejected to ambient air. The hot liquid refrigerant then exits the condenser and passes through an expansion valve, dropping the refrigerant to a low pressure and temperature. The low-temperature, low-pressure liquid refrigerant then enters the evaporator and the cycle begins again.

Current systems can use variable refrigerant flow (VRF) technology in which the speed of a compressor is varied to depending on the load-induced capacity requirements on the system. Such VRF operation has the advantage of reducing, or avoiding, repetitive on/off cycling of the compressor in prior systems that did not use VRF technology. The repetitive cycling of the compressor can result in energy inefficiency since the compressor may need to start-up and shut down repeatedly so that the refrigerant pressure within the device can remain at equilibrium and the system can re-establish the partial, or total, loss of temperature difference between an evaporator and a condenser within the system.

SUMMARY OF THE INVENTION

One embodiment is a vapor compression system that includes: at least one compressor having an inlet pressure and an outlet pressure; at least one evaporator; at least one condenser; a refrigerant expansion device; and a vector control system configured to control the speed of the compressor to satisfy a load and also configured to control the torque of the compressor by adjusting the airflow across the evaporator, the condenser, or both.

Another embodiment is a vector control system for increasing the efficiency of a vapor compression system. This embodiment includes: a processor and a control module having instructions configured to be run on the processor, wherein the instructions adjust refrigerant flow and a compression ratio in the vapor compression system based on controlling the speed of one or more motors to influence torque of each of the subject motors by referencing the speed, torque and energy efficiency characteristics of the subject motors as input parameters to control for optimal energy efficiency.

DETAILED DESCRIPTION

Figure 1:
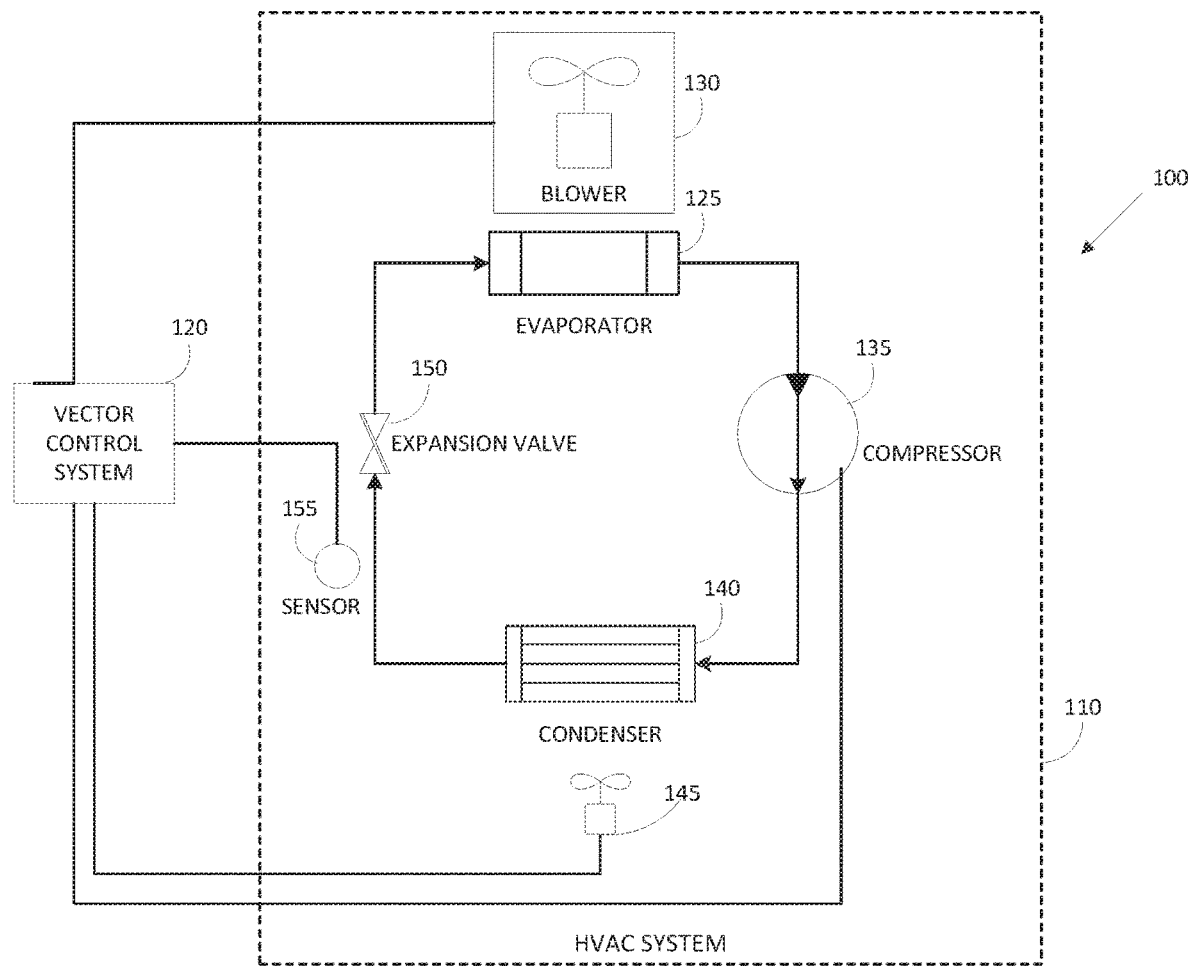
FIG. 1 is a schematic diagram of one embodiment of a HVAC system that has a vector control system.

Embodiments of the invention relate to vapor compression systems, such as air conditioners, heat pumps and refrigeration systems that employ a vector control system for increased efficiency. Embodiments are not limited to single stage vapor compression systems, but also include multi-stage systems which employ two or more compressors between the low said and high side refrigerant heat exchangers. These systems can be referred to as cascaded systems, and are further described in U.S. Pat. No. 9,239,174, which is hereby incorporated by reference in its entirety. The invention further applies to vapor compression cycles with intermediate pressure vapor or liquid injection into the compressor as well as eductor enhanced cycles. The vapor compression system may also include one or more reversing valves to operate as a cooling and heating pump. A reversing valve is a type of valve that may be a component in a heat pump. The one or more reversing valves allow the system to change the direction of refrigerant flow within the system. By reversing the flow of refrigerant, the heat pump refrigeration cycle is changed from cooling to heating. This allows a home or building to be heated and cooled by a single piece vapor compression system, using the same hardware.

Embodiments of the Vector Control System (VCS) described herein expand the one-dimensional speed control of a vapor compression system into a two dimensional speed and torque control system. Incorporating torque control into the system allows for optimal use of the compressor motor to increase the overall system efficiency. The VCS may control motors within the system such as the compressor motor as well as fan and blower motors within a vapor compression system. The VCS optimization process can take into account characteristics of the compressor motor's performance as a function of speed, compression ratio and absolute pressures. The VCS may also take into account other system motors in the system to improve the efficiency of condenser fan(s) and in some cases evaporator fans or blowers. Vector Drive control constitutes a two dimensional energy efficiency optimization incorporating refrigerant flow as well as high side (condenser) air flow and, in some instances low side (evaporator) air flow, deriving the best system energy efficiency obtainable at any given load and temperature condition.

In one example, an air conditioner operating condition that conventionally calls for a certain predetermined compressor speed at a set condition is improved by operating the compressor at a lower torque setting while using the same refrigerant flow. Although the system would be using less torque the resultant cooling capacity would remain the same because the refrigerant flow through the vapor compression circuit doesn't change. The lower compressor torque could be achieved by increasing the airflow of a condenser fan. This increased airflow would lower the condenser temperature and pressure which may decrease the torque required by the compressor to compress the refrigerant. Depending on the compressor motor and condenser fan characteristics, the additional energy required to increase the fan speed could be less than the energy saved by reducing the torque on the compressor. Thus, in this embodiment, the VCS would evaluate the energy required to increase the condenser fan speed and balance that against the energy saved by lowering the torque on the compressor. If the energy saved by reducing the torque on the compressor was greater than the energy required to increase the fan speed, then the VCS would increase the condenser fan to save energy overall.

In other embodiments, reducing the compressor torque may reduce the overall efficiency if the energy required to increase the speed of the condenser fan is more than the energy required to operate the compressor at a higher torque. Thus, the VCS system can vary different components in different systems within the vapor compression circuit to increase the overall system efficiency by modulating the torque placed on different motors and by adjusting the speed of the various motors to give the optimum energy efficiency.

In order to achieve such performance advantages, the performance characteristics as a function of speed and torque for all the subject motor systems is first determined. Commonly these motors include the compressor, condenser fan(s) or condenser blower(s) and at times evaporator fan(s) or evaporator blower(s).

TABLE 1

Exemplary Motor Characteristics

|  | Compressor Motor | Blower Motor | Condenser Motor |
|---|---|---|---|
| Voltage (VAC) | 230 | 230 | 230 |
| Torque (lb · in) | 175 | 17.5 | 26.2 |
| Speed (RPM) | 1800 | 3600 | 3600 |
| Power (HP) | 5 | 1 | 1.5 |

Once the characteristics of these motors are established they can be entered into the appropriate equations, approximations or tables, as indicated below. These VCS system then uses these equations, approximations and tables as input parameters to determine how to control the various vapor compression system motors under a given running condition. A properly optimized system would include consideration of all motor/compressor, motor/fan, ambient temperature, humidity, and load conditions to determine the best operating mode to run the system with the highest efficiency. Such a process may also include consideration of the operating frequencies for compressor motor(s) and fan motors to achieve higher capacities, often referred to as peak capacities, by overclocking motor operating frequencies. However, it should be realized that such overclocking does not always achieve a higher overall energy efficiency but instead is implemented to achieve a temporary peak capacity to overcome adverse operating conditions.

An additional embodiment that can lead to dramatic energy savings is the establishment of variable sensible heat ratios. Accounting for the latent and sensible heat ratio is important for equipment that is used in different climates, e.g. hot dry climates and humid climates. The relative humidity can be determined with known sensors based on dry bulb and wet bulb temperatures and become an input into the operating parameter data of the VCS. Alternately, if no such sensors are available, the system can be set to different humidity conditions by a software or hardware switch or pre-set for various degrees of humidity as expected to be typically encountered in the target operating environment. In one embodiment, the system carefully monitors the evaporator temperature and airflow over the system. For example, the airflow can be increased at a somewhat higher evaporator temperature to remove a larger than average amount of humidity from the air. This in turn will increase the low side pressure and thus reduce the compression ratio for the compressor.

Additionally, the VCS can include further energy efficiency realization during transients when the speed of the motors is changed. This can occur when the operating frequency is less than a nominal frequency. Transients can be induced by changing temperature, changing loads, and starts and stops. When the VCS is used to start or change the speed of one or more motors, a low frequency, low voltage power signal is initially applied to each motors. In some embodiments, the frequency may be about 2 Hz or less. Starting at such a low frequency allows the capacity to be driven within the capability of the motor, and avoids the high inrush current that occurs at start up, or transients that occur with the constant frequency and voltage power supply. The VCS is used to increase the frequency and voltage to the motor using a pre-programmable time profile stored within the system that accounts for torque and speed characteristics of the motor, which keeps the acceleration of the capacity within the capability of the motor. As a result, the capacity is accelerated without drawing excessive current. This starting method allows a motor to develop about 150% of its rated torque while drawing only 50% of its rated current. As a result, the Vector Drive allows for reduced motor starting current from the AC power source, reducing operational costs, placing less mechanical stress on the compressor motor, and increasing service life. The Vector drive also allows for programmable control of acceleration and deceleration of the capacity in its quest to track the load.

In order to effectively achieve energy efficiency gains the multi-motor control also can translate be able to indicate an accurate refrigerant flow control. This is best achieved with active refrigerant expansion devices that can actively alter the refrigerant flow. While conventional modulating expansion valves can achieve such goal to some extent, pulsing expansions valves can also be used, such as described in U.S. Pat. Nos. 6,843,064 5,675,982. Electronically controlled valves for refrigerant control as described in U.S. Pat. No. 5,463,876 may also be used in embodiments of the invention.

FIG. 1 shows an exemplary vapor compression system 100. The system includes an HVAC system 110 that includes a Vector Control System 120 configured to control operation of the HVAC system 110. The VCS 120 connects to a condenser fan 145 that is located adjacent a condenser 140. The condenser fan 145 is positioned to increase or decrease the amount of air flow over the condenser 140 as controlled by the VCS 120. A condensing fan motor is normally either single phase or three phase and usually operates at 240 volts. The VCS system is designed to work with all conventional condenser fans. In addition, the condenser fan 145 may be capable of speed control such that the speed of the motor within the condenser fan 145 is configurable depending on the control signal outputs from the VCS 120.

The HVAC system 110 also includes a compressor 135 that is also controllable by the VCS 120. The compressor 135 may be any conventional single phase or three phase compressor as typically used in an HVAC system. In some embodiments, the compressor is a variable speed compressor that uses frequency modulation to adjust power output of the compressor motor. This control allows the compressor to speed up or slow down according to the heating or cooling requirements placed on the HVAC system 110. The ability to adjust speed and power requirements of the compressor 135 can increase the overall system efficiency since the compressor 135 can run at the proper capacity for a given load instead of toggling on or off to maintain the desired temperature.

The HVAC system 110 also includes an evaporator 125 located adjacent a blower 130. The blower 130 is configured to move air across the coils in order to deliver cold air to the target room or space. The motor within the blower 130 may be a single speed or variable speed motor.

Located between the condenser 140 and the evaporator 125 is an expansion valve 150 that expands the coolant from the condenser back into a gas to be directed to the evaporator 125 and complete the refrigeration cycle within the HVAC system 110.

A temperature and humidity sensor 155 is also located within the HVAC system 155 that is configured to read the current temperature and humidity and return that data to the VCS 120. As discussed above, the VCS can use the temperature and humidity to properly adjust the motor operations of each motor within the system in order to maximize the efficiency of the system.

Figure 2:
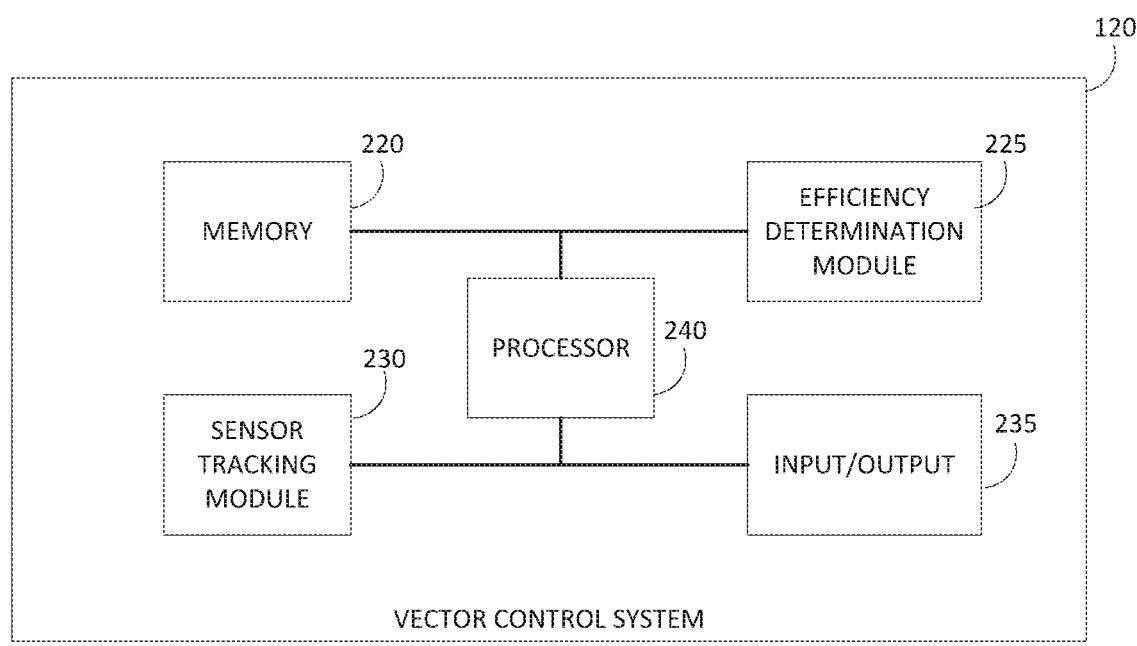
FIG. 2 is a schematic diagram of a vector control system according to one embodiment of the invention.

FIG. 2 shows more details on the VCS 120. As illustrated, the VCS 120 includes a memory 220 configured to store data relating to the operation of the VCS 120. For example, the memory 220 may store state tables or lookup tables used by the VCS 120 to configure each of the motors within the system depending on a particular temperature or humidity.

TABLE 2

Example Lookup Table

| Frequency (Hz) | Condenser Temperature (° C.) | Evaporator Temperature (° C.) | Cooling (W) | Power Draw (W) | COP |
|---|---|---|---|---|---|
| 60 | 80 | 10 | 1953 | 1580 | 1.24 |
| 60 | 80 | 15 | 2389 | 1662 | 1.44 |
| 60 | 80 | 20 | 2906 | 1739 | 1.67 |
| 60 | 80 | 25 | 3514 | 1812 | 1.94 |
| 60 | 80 | 30 | 4225 | 1885 | 2.24 |
| 50 | 40 | −10 | 1375 | 623 | 2.21 |
| 50 | 40 | −5 | 1746 | 651 | 2.68 |
| 50 | 40 | 0 | 2192 | 673 | 3.26 |
| 50 | 40 | 5 | 2273 | 695 | 3.27 |
| 50 | 40 | 10 | 3348 | 720 | 4.65 |
| 50 | 40 | 15 | 4078 | 752 | 5.42 |
| 50 | 40 | 20 | 4922 | 795 | 6.19 |

The memory 220 is electrically connected to an efficiency determination module 225 that is configured to read the data stored in the memory 220 and determine how to adjust motors with the vapor compression system. The efficiency determination module 225 may include information on the type of motors within the vapor compression system and how they can be adjusted to meet a particular target efficiency level. A sensor tracking module 230 that is connected to an I/O port 235 may be part of the VCS 120, which is all running under the control of a processor 240. The processor 240 may be configured by the efficiency determination module 225 to determine the proper settings for each motor within a vapor compression system.

Figure 3:
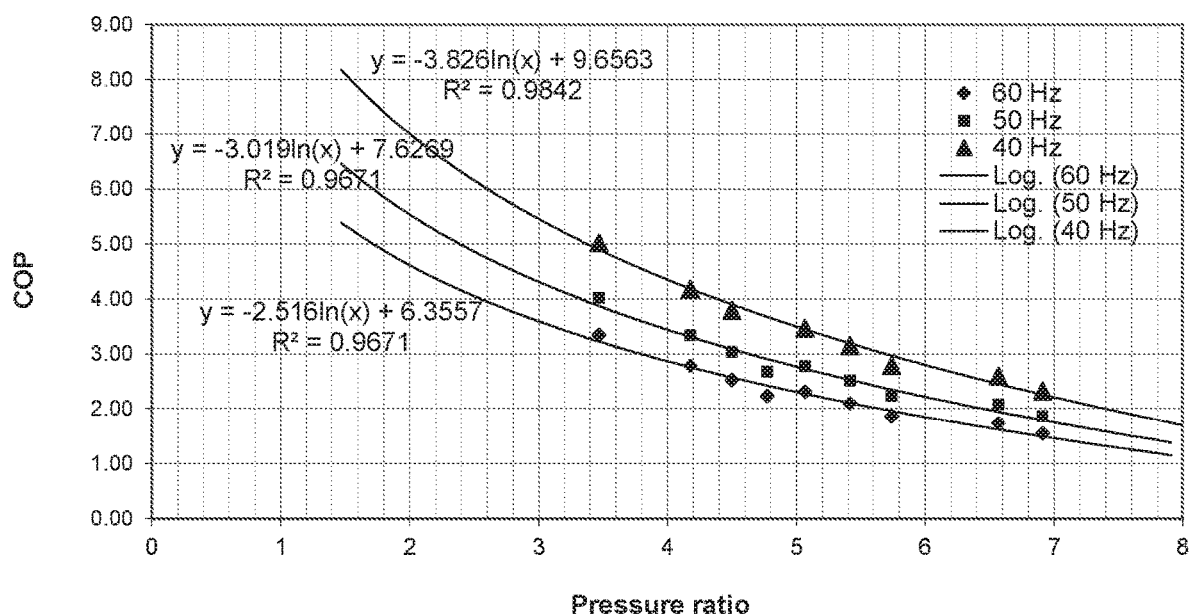
FIG. 3 is a line graph showing that vector drive technology as discussed herein resulted in higher efficiency at partial speeds and loads.

FIG. 3 is a line graph that illustrates two dimensional control of speed and torque using a Vector Control System when applied in practice to a compressor. The X-Axis is a pressure ratio defined as ratio of high side pressure to low side pressure of the compressor in a vapor compression system. The Y-axis is a Coefficient of Performance (COP) ratio of heating or cooling capacity to work required. As shown, with vector control technology in place the maximum compressor efficiency can only be achieved when motor speed and torque are controlled and varied at the same time. In the example shown the compressor speed measured at 60 Hz, 50 Hz and 40 Hz and data points were taken at 8 different pressure ratios for each frequency. The goal to achieve the highest efficiency was accomplished by applying the correct voltage/torque to the motor at lower pressure loads. This resulted in the optimal COP versus pressure ratio.

Most conventional compressors are still powered using electrical motors designed to run at a single speed since the motors are designed to operate efficiently at their rated speed. Reducing compressor speed will not necessarily result in higher efficiency without properly and intelligently implemented use of the vector drive technology. If the controls are not intelligent then lowering speeds can result in lowering motor efficiency and potential damage to the motor windings. Electrical motors are built with the right amount of slip to allow for maximum efficiency. They are designed to operate at their rated slip, while operating at maximum (design) load. The amount of slip, however, does vary as the speed changes. As the slip strays from its ideal lag behind the magnetic flux, the motor performance also drops. It is however possible to return to optimal performance by supplying the proper amount of voltage to maintain the right amount of slip. Thus, adjusting the voltage increases energy efficiency to optimize motor operation when the motor is running at a partial load. While the capacity can be adjusted to meet the thermal load by properly selecting the operating frequency of the compressor motor, the energy efficiency optimization of providing torque against the load can be best addressed with multi-motor control of compressor and fan motors, the most energy efficient compressor motor operation at any given torque and capacity is achieved by selecting a voltage that results in the optimum slip.

Slip to voltage relations of compressor/motor systems are usually not published or available from the manufacturer. However, the relations can be experimentally determined so that the optimum slip is found by measuring the energy efficiency at any given pressure ratio and motor speed (frequency) as a function of voltage.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A vapor compression system, comprising:
a compressor having an inlet pressure and an outlet pressure;
an evaporator and a first fan associated with the evaporator;
a condenser and a second fan associated with the condenser;
a refrigerant expansion device;
a first motor operatively connected to the first fan to adjust airflow across the evaporator;
a second motor operatively connected to the second fan to adjust airflow across the condenser, wherein an increased airflow reduces the outlet pressure and a decreased airflow increases the outlet pressure; and
a vector control system configured to increase the energy efficiency of the system given a particular thermal load by controlling the compressor torque by increasing the speed of the second motor to reduce the outlet pressure if the amount of energy required to increase the second motor is less than the energy saved by reducing the compressor torque.

2. The vapor compression system of claim 1, further comprising adjusting the speed of the first motor to alter the airflow across the evaporator, and change the inlet pressure of the compressor to increase the energy efficiency of the vapor compression system.

3. The vapor compression system of claim 1, where the vapor compression system comprises an HVAC system that provides cooling to an airflow or liquid.

4. The vapor compression system of claim 1, wherein the vapor compression system comprises a refrigeration system providing refrigeration to an airflow or heat transfer fluid or suction to a low pressure receiver.

5. The vapor compression system of claim 1, wherein the vapor compression system comprises a heat pump that provides heating to an airflow or liquid.

6. The vapor compression system of claim 1, wherein the vapor compression system comprises one or more reversing valves to allow the system to operate as a heat pump.

7. The vapor compression system of claim 1, wherein the refrigerant expansion device is a pulsing expansion valve.

8. The vapor compression system of claim 1, wherein the vector control system comprises a memory storing performance characteristics of the compressor and the first and second motors.

9. The vapor compression system of claim 1, wherein the vector control system is configured to adjust the voltage to the compressor to optimize any compressor motor slip in order to increase the energy efficiency of the vapor compression system.

10. The vapor compression system of claim 1, wherein the vapor compression system is configured to vary the amount of torque on the compressor motor as part of satisfying the particular thermal load.

11. The vapor compression system of claim 1, wherein the vector control system comprises a lookup table of frequency, cooling watts and power draw of the compressor at different condenser and evaporator temperatures.

* * * * *